March 12, 1935.   J. P. MADDEN   1,994,141
FRICTION CLUTCH AND THE LIKE
Filed Dec. 11, 1931

Inventor
James P. Madden.
By R. S. C. Dougherty.
Attorney

Patented Mar. 12, 1935

1,994,141

UNITED STATES PATENT OFFICE 1,994,141

FRICTION CLUTCH AND THE LIKE

James P. Madden, Bethlehem, Pa., assignor to Bethlehem Steel Company, a corporation of Pennsylvania Application December 11, 1931, Serial No. 580,298

4 Claims. (Cl. 192—105)

My invention relates to the construction of bands for centrifugal clutches and the like in which a band is desired which shall be of uniform curvature, reasonably flexible, and of sufficient weight to secure the necessary centrifugal force.

Figure 1:
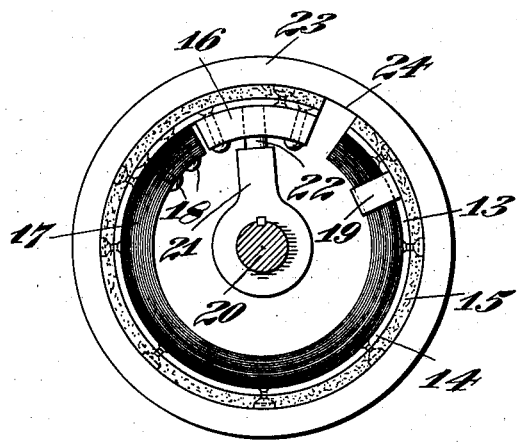
Fig. 1 is an elevation of a centrifugal clutch having a band of my improved construction.

In Fig. 1, which illustrates one form of the invention, band 13 consists of strip 14 bent to annular form leaving a gap between its ends. To the outer surface of this strip is riveted friction lining 15 and to the inner surface, shoe 16 and weighting member 17. The latter is made up of a number of strips of thin material fitting together to form a flexible laminated structure. It is attached at one end to strip 14 by rivets 18 and held in place at the opposite end by the loose fitting cleat 19, welded or otherwise fastened to this strip. By this method of connection sliding of the laminated elements can take place, thus securing a maximum of flexibility in the structure to permit contraction or expansion in diameter. A band of this type is advantageously used in a centrifugally operated clutch such as is indicated in Fig. 1. Here 20 is a shaft driven by a source of power, driving band 13 through the medium of arm 21 keyed to shaft 20 and peg 22, a portion of this arm, which fits into shoe 16 of band 13. Drum 23 is adapted to be frictionally driven by this band, its inner surface 24 contacting with lining 15 on band 13. With an arrangement of this sort the torque transmitted between shaft 20 and drum 23 will depend on the centrifugal force operating on the band and for any given speed of revolution this centrifugal force will depend on the weight of the band. By providing the proper total thickness of laminations the necessary weight can be secured, and by making the individual laminations sufficiently thin any desired degree of flexibility may be obtained.

Figure 2:
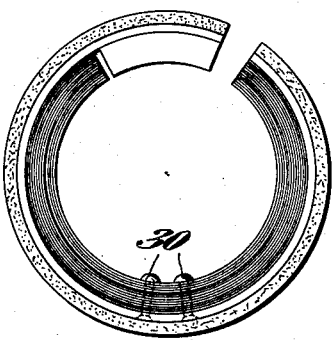
Fig. 2 shows an alternative band construction.

It is in general desirable that the laminations of the weighting member be connected together and to the remaining structure of the band at a single point to secure flexibility as mentioned above, but this point need not be at one end of the band. In Fig. 2 is shown a construction where the connection is made at the middle point by the rivets 30, and the cleat is omitted. Instead of rivets, welding or other methods may be employed.

Figure 3:
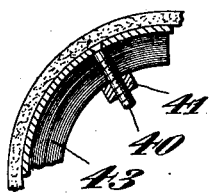
Fig. 3 represents an alternative in a detail of the construction.

In Fig. 3 is shown a scheme in which the attachment of the weighting ring consists of a threaded stud 40 and nut 41. Such a construction permits adjustment of the weight of the weighting member 43 by removing or adding laminations.

It has been found in practice that a laminated weighting member can readily be manufactured by winding strip metal on a mandrel of suitable size and then annealing while still on the mandrel. It is obvious, however, that it can also be produced simply by curving the individual laminations or, if very thin laminations are provided, they may flex to the desired circle without any initial shaping.

While the construction described contemplates the use of a weighting member as a distinct element of the band structure, this weighting member may also serve additional functions. In Fig. 1 for instance strip 14 may be omitted and shoe 16 be welded to the end of the laminated weighting member, while the friction lining is cemented or otherwise attached to its outside circumference. Further, the friction lining may be omitted, the outside lamination of the weighting member frictioning directly against the drum. In this case it may be desirable to line the internal surface of the drum with friction material or to make the laminations themselves of fabric or other material which has good frictional characteristics.

Figure 4:
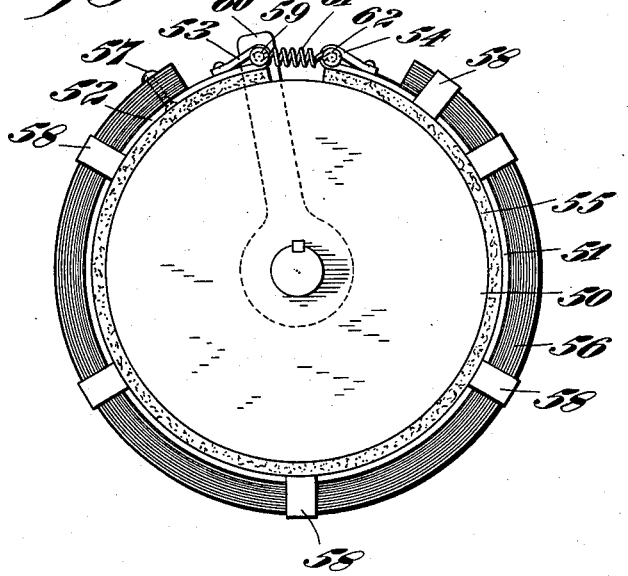
Fig. 4 shows a further alternative band construction.

While the illustrations show an internal expanding band, it may in certain cases be desirable to use an external band, as shown in Fig. 4. Here 50 is a drum engaged by band 51, the latter consisting of strip 52 formed into eyes 53 and 54 at its ends, friction lining 55 and laminated weighting member 56. This member is attached to strip 52 by rivets 57 and held radially thereto by cleats 58 spaced around the periphery. A driving connection is established with pin 59 in eye 53 by arm 60 which is keyed to a shaft concentric with, but rotatable in relation to drum 50. A spring 61 between pin 59 and pin 62 in eye 54 normally holds the ends of the band together and causes a frictional contact between band and drum. Under the action of centrifugal force, however, the force of this spring is counteracted and therefore at a definite speed the driving connection ceases.

There are various advantages in the use of such a weighting member over one constructed of a number of individual solid weights riveted at spaced intervals along the band. The laminated weighting member presses more uniformly along its length and has less tendency to distort the band from its circular shape. As there are no gaps a greater weight of metal can be put in a given space. The weight of the member can be readily altered to suit the requirements of a given installation merely by providing a different number of laminations. Moreover the cost is substantially less than in a construction wherein a plurality of weights are spaced at intervals along the band.

Having thus described my invention what I claim as new and desire to secure by Letters Patent is:

1. In a friction clutch and the like, a band member expansible by flexure forming a segment of an annulus having a friction surface and comprising a plurality of laminae free to slide on each other for a major portion of their length, during change of curvature of the band.

2. In a friction clutch and the like, a centrifugally operated band member expansible by flexure which forms a segment of an annulus, comprising a plurality of nested laminae, each of said laminae being connected to an adjacent lamina at a restricted portion of the circumference.

3. In a friction device, a primary band member of circular shape expansible by flexure having a friction surface, a secondary band member nesting with said principal band member and attachment means connecting a point of said secondary band member to a point of said primary band member, portions of said band members being free to slide relatively to one another.

4. In a friction device, a band member of circular shape expansible by flexure having a friction surface, a laminated weighing member attached to said band member, a rotatable power member attached to a point of said band member, and a drum member to frictionally engage said band member, the individual laminae of said weighting member being free to slide relatively to one another for the major portion of their length during change of curvature of the band.

JAMES P. MADDEN.